United States Patent
Ochi et al.

(10) Patent No.: US 12,033,383 B2
(45) Date of Patent: Jul. 9, 2024

(54) IMAGING DATA GENERATION APPARATUS, IMAGING DATA GENERATION METHOD, AND PROGRAM

(71) Applicant: SONY INTERACTIVE ENTERTAINMENT INC., Tokyo (JP)

(72) Inventors: Takayuki Ochi, Kanagawa (JP); Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/614,817

(22) PCT Filed: Jun. 21, 2019

(86) PCT No.: PCT/JP2019/024816
§ 371 (c)(1),
(2) Date: Nov. 29, 2021

(87) PCT Pub. No.: WO2020/255408
PCT Pub. Date: Dec. 24, 2020

(65) Prior Publication Data
US 2022/0230435 A1    Jul. 21, 2022

(51) Int. Cl.
*G06V 20/30*    (2022.01)
*G06T 5/00*    (2006.01)

(52) U.S. Cl.
CPC ............ *G06V 20/30* (2022.01); *G06T 5/00* (2013.01)

(58) Field of Classification Search
CPC combination set(s) only.
See application file for complete search history.

(56) References Cited

U.S. PATENT DOCUMENTS

| | | | |
|---|---|---|---|
| 9,720,505 B2 * | 8/2017 | Gribetz | G06F 3/013 |
| 10,168,791 B2 * | 1/2019 | Gribetz | G06F 3/011 |
| 10,540,014 B2 * | 1/2020 | Gribetz | G06F 3/04842 |
| 2006/0008145 A1 * | 1/2006 | Kaku | G06V 40/161 |
| | | | 382/173 |

(Continued)

FOREIGN PATENT DOCUMENTS

| | | | | |
|---|---|---|---|---|
| CN | 104866520 | * | 8/2015 | G06F 16/7328 |
| CN | 105912667 | * | 8/2016 | G06F 16/9535 |

(Continued)

OTHER PUBLICATIONS

International Search Report and Written Opinion mailed Sep. 17, 2019, from PCT/JP2019/024816, 7 sheets.

(Continued)

*Primary Examiner* — Zhiyu Lu
(74) *Attorney, Agent, or Firm* — XSENSUS LLP

(57) ABSTRACT

There are provided an imaging data generation apparatus, an imaging data generation method, and a program for enriching data accumulated as a life log. A sensing data reception section (40) receives multiple captured images successively. A life log data generation section (42) generates an environmental map based on the multiple captured images. The life log data generation section (42) generates imaging data indicative of an imaging position or a subject of the captured image, the imaging data being associated with the environmental map.

17 Claims, 4 Drawing Sheets

(56) References Cited

U.S. PATENT DOCUMENTS

| | | | |
|---|---|---|---|
| 2008/0144125 A1* | 6/2008 | Okamoto | H04N 1/00838 |
| | | | 358/453 |
| 2014/0184496 A1* | 7/2014 | Gribetz | G06F 3/0482 |
| | | | 345/156 |
| 2015/0169754 A1* | 6/2015 | Gu | G06F 16/5838 |
| | | | 707/728 |
| 2015/0169999 A1* | 6/2015 | Duerig | G06F 18/29 |
| | | | 382/159 |
| 2016/0070953 A1* | 3/2016 | Yamaji | G06V 20/70 |
| | | | 382/118 |
| 2018/0025003 A1* | 1/2018 | Marriott | G06F 16/51 |
| | | | 707/740 |
| 2018/0095541 A1* | 4/2018 | Gribetz | G06F 3/017 |
| 2018/0150433 A1* | 5/2018 | Sowden | G06F 3/0481 |
| 2018/0197290 A1* | 7/2018 | Kasai | G06T 7/74 |
| 2018/0225524 A1* | 8/2018 | Fujita | G06V 20/10 |
| 2019/0278379 A1* | 9/2019 | Gribetz | G06F 3/0482 |
| 2020/0193238 A1* | 6/2020 | Ghuge | G06F 18/24 |

FOREIGN PATENT DOCUMENTS

| | | | | |
|---|---|---|---|---|
| JP | 2010072982 A | | 4/2010 | |
| JP | 2011248832 | * | 12/2011 | G01C 21/00 |
| JP | 2011248832 A | | 12/2011 | |
| JP | 2013232064 A | | 11/2013 | |
| JP | 2018128314 A | | 8/2018 | |
| JP | 2018205950 A | | 12/2018 | |

OTHER PUBLICATIONS

Decision to Grant dated Nov. 29, 2022, from Japanese Patent Application No. 2021-528626, 2 sheets.

* cited by examiner

IMAGING DATA GENERATION APPARATUS, IMAGING DATA GENERATION METHOD, AND PROGRAM

TECHNICAL FIELD

The present invention relates to an imaging data generation apparatus, an imaging data generation method, and a program.

BACKGROUND ART

There is known a technology that allows sensing data such as images, sounds, and position information acquired by a tracker to be recorded as a life log of a user wearing the tracker.

SUMMARY

Technical Problem

In employing the above life log, it is preferred that not only the sensing data but also various kinds of data be accumulated in the life log.

The present invention has been made in view of the above circumstances. An object of the invention is therefore to provide an imaging data generation apparatus, an imaging data generation method, and a program for enriching the data accumulated in the form of a life log.

Solution to Problem

In solving the above problem and according to the present invention, there is provided an imaging data generation apparatus including a captured image reception section configured to receive a captured image successively, an environmental map generation section configured to generate an environmental map based on multiple captured images, and an imaging data generation section configured to generate imaging data indicative of an imaging position or a subject of the captured image, the imaging data being associated with the environmental map.

One embodiment of the present invention further includes an identification section configured to identify a portion of the multiple captured images meeting a predetermined condition, on the basis of the environmental map and the imaging data.

In the above embodiment, given the multiple captured images, the identification section may identify the captured image depicting the subject existing in a given place in the environmental map, on the basis of the environmental map and the imaging data.

Alternatively, given the multiple captured images, the identification section may identify a portion of the multiple captured images, on the basis of a degree of rarity of the captured image associated with the imaging data, the degree of rarity being evaluated on the basis of the imaging data.

In this embodiment, the identification section may identify a portion of the multiple captured images, on the basis of density of positions in which the captured images are acquired.

Also, the imaging data may be either data indicative of an imaging position and an imaging direction of the captured image in the environmental map or data indicative of the position of the subject in the environmental map.

Also, the imaging data generation section may generate, from the identified portion of the captured images, an image higher in quality than the portion of the captured images.

Also, according to the present invention, there is provided an imaging data generation method including a step of receiving a captured image successively, a step of generating an environmental map based on multiple captured images, and a step of generating imaging data indicative of an imaging position or a subject of the captured image, the imaging data being associated with the environmental map.

Also, according to the present invention, there is provided a program for causing a computer to perform a procedure of receiving a captured image successively, a procedure of generating an environmental map based on multiple captured images, and a procedure of generating imaging data indicative of an imaging position or a subject of the captured image, the imaging data being associated with the environmental map.

DESCRIPTION OF EMBODIMENT

One preferred embodiment of the present invention is described below in detail with reference to the accompanying drawings.

Figure 1:
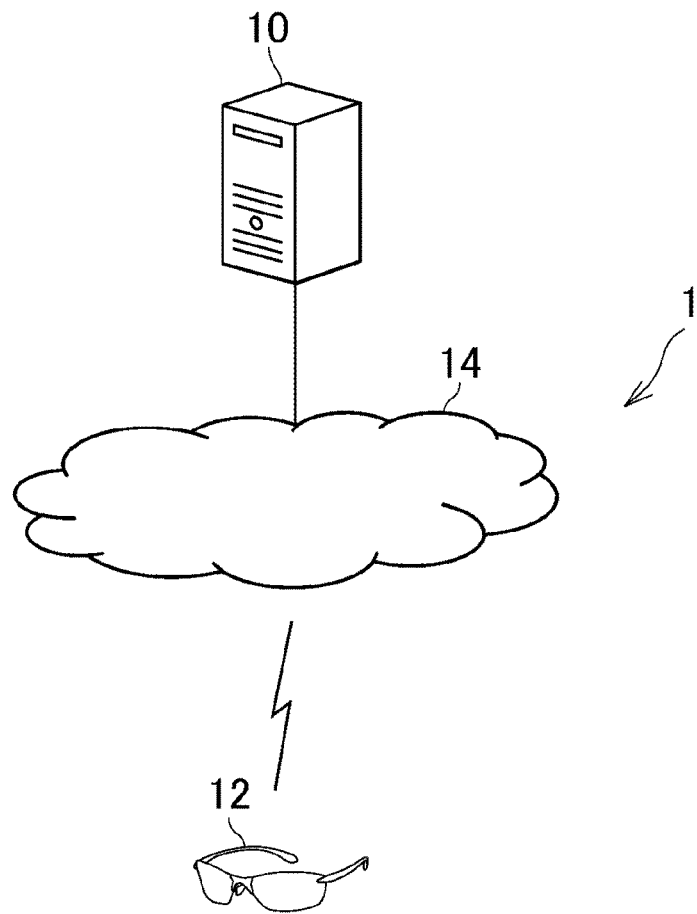
FIG. 1 is a configuration diagram depicting an example of a life log management system as one embodiment of the present invention.

FIG. 1 is a configuration diagram depicting an example of a life log management system 1 as one embodiment of the present invention. As depicted in FIG. 1, the life log management system 1 of this embodiment includes a server 10 and a tracker 12.

The server 10 and the tracker 12 are connected to a computer network 14 such as the Internet. In this embodiment, the server 10 and the tracker 12 can communicate with each other.

The server 10 of this embodiment is, for example, a server computer used by a user of the life log management system 1.

Figure 2A:
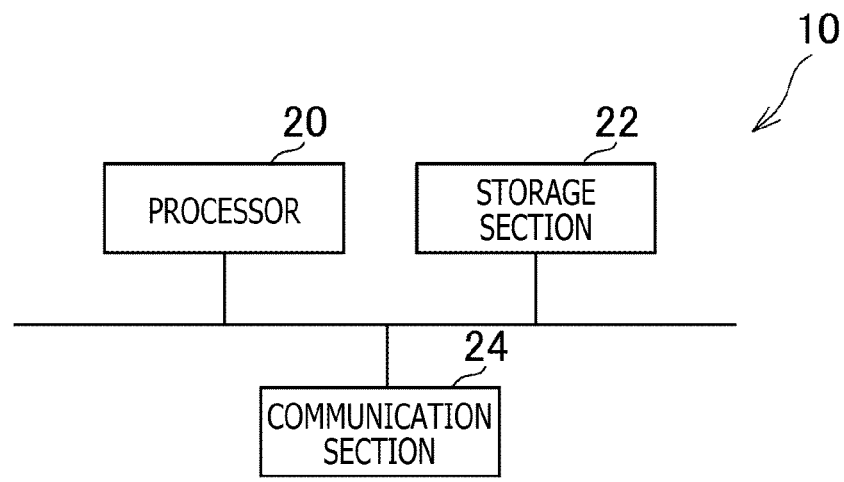
FIG. 2A is a configuration diagram depicting an example of a server in one embodiment of the present invention.

As depicted in FIG. 2A, the server 10 of this embodiment includes a processor 20, a storage section 22, and a communication section 24. The processor 20 is a program-controlled device such as a CPU (Central Processing Unit) operating in accordance with programs installed in the server 10, for example. The storage section 22 is a storage element such as a ROM (Read-Only Memory) or a RAM (Random Access Memory), or a hard disk drive, for example. The storage section 22 stores the programs to be executed by the processor 20. The communication section 24 is a communication interface such as a network board or a wireless LAN (Local Area Network) module.

The tracker 12 of this embodiment is an apparatus that tracks the position and direction of the user wearing the tracker 12.

Figure 2B:
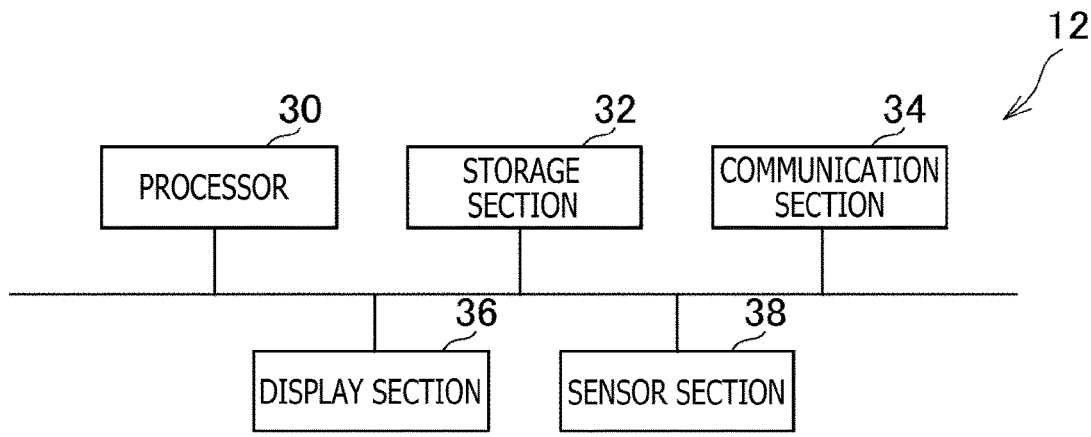
FIG. 2B is a configuration diagram depicting an example of a tracker in one embodiment of the present invention.

As depicted in FIG. 2B, the tracker 12 of this embodiment includes a processor 30, a storage section 32, a communication section 34, a display section 36, and a sensor section 38.

The processor 30 is, for example, a program-controlled device such as a microprocessor operating in accordance with the programs installed in the tracker 12. The storage section 32 is a storage element such as a memory. The storage section 32 stores the programs to be executed by the processor 30. The communication section 34 is a communication interface such as a wireless LAN module, for example.

The display section 36 is a display such as a liquid-crystal display or an organic EL (Electroluminescence) display arranged at the front of the tracker 12. The display section 36 of this embodiment can display a three-dimensional image by presenting a left-eye image and a right-eye image, for example. Alternatively, the display section 36 may be configured to display not three-dimensional images but two-dimensional images only.

The sensor section 38 is a set of sensors including, for example, a camera, a microphone, an inertial sensor (IMU), a geomagnetic sensor (direction sensor), a GPS (Global Positioning System) module, and a depth sensor. The camera included in the sensor section 38 captures images at a predetermined sampling rate, for example. The microphone included in the sensor section 38 generates sound data based on input sounds at a predetermined sampling rate, for example. The inertial sensor included in the sensor section 38 outputs data indicative of the acceleration, amount of rotation, and amount of displacement of the tracker 12 to the processor 30 at a predetermined sampling rate. The geomagnetic sensor included in the sensor section 38 outputs data indicative of the direction in which the tracker 12 is oriented to the processor 30 at a predetermined sampling rate. The GPS module included in the sensor section 38 outputs data indicative of the latitude and longitude of the tracker 12 to the processor 30 at a predetermined sampling rate.

The depth sensor included in the sensor section 38 is a depth sensor that utilizes ToF (Time of Flight), Patterned stereo, or Structured Light technology, for example. The depth sensor outputs data indicative of the distance from the tracker 12 to the processor 30 at a predetermined sampling rate.

The sensor section 38 may further include other sensors such as an RF (Radio Frequency) sensor, an ultrasonic sensor, an event-driven sensor, a pulse rate sensor, a heartbeat sensor, and a body temperature sensor.

The tracker 12 of this embodiment may include an input/output port such as an HDMI (High-Definition Multimedia Interface) (registered trademark) port, a USB (Universal Serial Bus) port, and an AUX (Auxiliary) port, as well as headphones and speakers.

In this embodiment, the tracker 12 transmits to the server 10 the sensing data output from the above-mentioned diverse sensors included in the sensor section 38 of the tracker 12.

Also, in this embodiment, SLAM (Simultaneous Localization and Mapping) processing including self-position estimation and environmental map generation is carried out on the basis of the sensing data. The self-position estimation involves estimating at least either the position or the direction of the tracker 12, for example. Here, a global position and a global direction of the tracker 12 may be estimated.

Also, in this embodiment, the SLAM processing generates an environmental map based on the sensing data acquired by the tracker 12. The environmental map constitutes data that is generated on the basis of the sensing data through the SLAM processing and which is indicative of objects such as point clouds, 3D (Three-Dimensional) meshes, and textures.

In this embodiment, the above-mentioned sensing data, environmental map, and various kinds of data generated from the sensing data and the environmental map are accumulated in the server 10 as the life log.

In this manner, the accumulated life log data is enriched by the embodiment.

Explained below in more detail are the functions of the server 10 and tracker 12 of this embodiment as well as the processes performed by the server 10.

Figure 3:
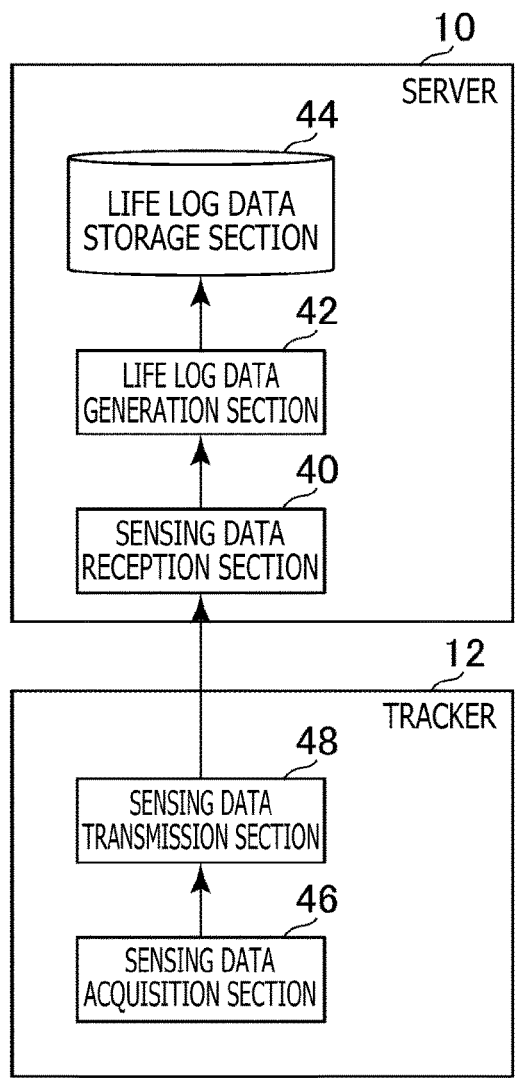
FIG. 3 is a functional block diagram depicting examples of functions implemented by the life log management system as one embodiment of the present invention.

FIG. 3 is a functional block diagram depicting examples of functions implemented by the server 10 and tracker 12 of this embodiment. It is to be noted that the server 10 and tracker 12 of this embodiment need not implement all functions depicted in FIG. 3 and that other functions than those in FIG. 3 may also be implemented.

As depicted in FIG. 3, the server 10 functionally includes a sensing data reception section 40, a life log data generation section 42, and a life log data storage section 44, for example. The sensing data reception section 40 is implemented using mainly the communication section 24. The life log data generation section 42 is implemented using mainly the processor 20. The life log data storage section 44 is implemented using mainly the storage section 22.

The above-mentioned functions may alternatively be implemented by the processor 20 executing programs that include the commands corresponding to these functions, the programs being installed in the server 10 acting as a computer. The programs may be supplied to the server 10 by means of computer-readable information storage media such as an optical disk, a magnetic disk, a magnetic tape, a magneto-optical disk, or a flash memory, or by way of the Internet, for example.

Also, as depicted in FIG. 3, the tracker 12 functionally includes a sensing data acquisition section 46 and a sensing data transmission section 48. The sensing data acquisition section 46 is implemented using mainly the processor 30 and the sensor section 38. The sensing data transmission section 48 is implemented using mainly the communication section 34.

The above-mentioned functions may alternatively be implemented by the processor 30 executing programs that include the commands corresponding to these functions, the programs being installed in the tracker 12 acting as a computer. The programs may be supplied to the tracker 12 by means of computer-readable information storage media such as an optical disk, a magnetic disk, a magnetic tape, a magneto-optical disk, or a flash memory, or by way of the Internet, for example.

In this embodiment, for example, the sensing data acquisition section 46 successively acquires the sensing data generated by the sensor section 38 of the tracker 12.

The sensing data acquired by the sensing data acquisition section 46 may include images captured by the camera included in the sensor section 38, for example. Here, the camera may also capture moving images. The sensing data acquired by the sensing data acquisition section 46 may further include captured images as the frames of moving images captured by the camera. The sensing data acquired by the tracker 12 may also include sound data generated by the microphone included in the sensor section 38. The sensing data may further include depth data measured by the camera and the depth sensor included in the sensor section 38 of the tracker 12.

The sensing data acquired by the tracker 12 may also include data indicative of the direction of the tracker 12, the data being measured by the geomagnetic sensor included in the sensor section 38 of the tracker 12. The sensing data acquired by the tracker 12 may further include data indicative of the acceleration, amount of rotation, and amount of displacement of the tracker 12, the data being measured by the inertial sensor included in the sensor section 38.

The sensing data acquired by the tracker 12 may also include data indicative of the latitude and longitude of the tracker 12, the data being measured by the GPS module included in the sensor section 38. The sensing data acquired by the tracker 12 may further include feature point groups (key frames).

The sensing data acquired by the tracker 12 may also include healthcare data indicative of pulse rate, heartbeat, and body temperature, for example.

In this embodiment, for example, the sensing data transmission section 48 successively transmits the sensing data acquired by the sensing data acquisition section 46 to the server 10. In this embodiment, what is transmitted is the sensing data associated with sensing point-in-time data indicative of the points in time at which sensing is performed by the tracker 12, for example.

In this embodiment, for example, the acquisition and transmission of the sensing data are performed repeatedly by the tracker 12. Alternatively, the acquisition and transmission of the sensing data may be carried out by the tracker 12 at predetermined time intervals.

In this embodiment, for example, the sensing data reception section 40 successively receives the sensing data transmitted from the sensing data transmission section 48 of the tracker 12.

In this embodiment, for example, the life log data generation section 42 generates life log data based on the sensing data received by the sensing data reception section 40. In this embodiment, the life log data generation section 42 stores the generated life log into the life log data storage section 44, for example.

In this embodiment, for example, the life log data storage section 44 stores the above-mentioned life log data.

Figure 4:
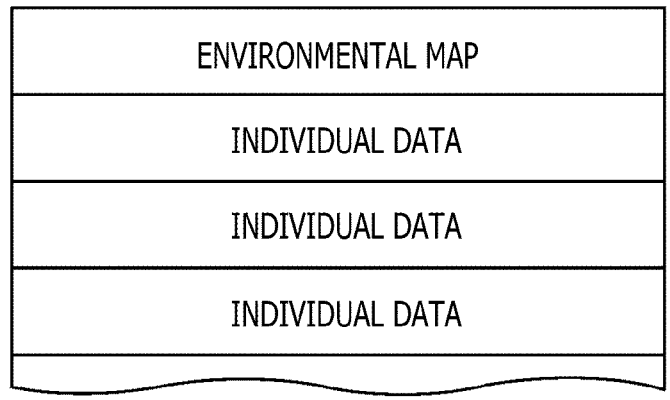
FIG. 4 is a schematic diagram depicting an example of a data structure of life log data.

FIG. 4 is a schematic diagram depicting an example of the data structure of the life log data stored in the life log data storage section 44. As depicted in FIG. 4, the life log data includes an environmental map and multiple individual data items, for example.

The life log data generation section 42 performs SLAM processing including estimation of the position or direction of the tracker 12, on the basis of multiple sensing data items received by the sensing data reception section 40, for example. Here, a global position and a global direction of the tracker 12 may be estimated. Here, the life log data generation section 42 may perform SLAM processing including processes of relocalization, loop closing, 3D meshing, and object recognition, for example.

The above SLAM processing may also include processes of plane detection and 3D mesh segmentation. The processes of plane detection and 3D mesh segmentation involve detecting a continuous plane such as the ground and walls and segmenting the detected plane as a whole 3D mesh into individual 3D meshes such as ground, buildings, and trees.

The SLAM processing may further include a process of 3D mesh optimization. The 3D mesh optimization process involves deleting, from the 3D meshes, parts estimated to be mobile objects and noise-induced contamination, reducing the number of polygons, and smoothing out the mesh surface. The SLAM processing may further include a process of texture generation. The texture generation process involves generating a texture image with respect to the 3D meshes on the basis of mesh apex colors.

As another example, the life log data generation section 42 may perform the SLAM processing by using time-series sensing data.

The above-described SLAM processing performed by the life log data generation section 42 generates the environmental map. Here, the life log data generation section 42 may generate a four-dimensional environmental map that dimensionally includes a three-dimensional space and time and which permits identification of a three-dimensional environmental map at a designated point in time. The environmental maps thus generated are stored into the life log data storage section 44 as part of the life log data.

In this embodiment, for example, the life log data generation section 42 also generates individual data including the sensing data received by the sensing data reception section 40 and the sensing point-in-time data associated with the received sensing data.

Figure 5:
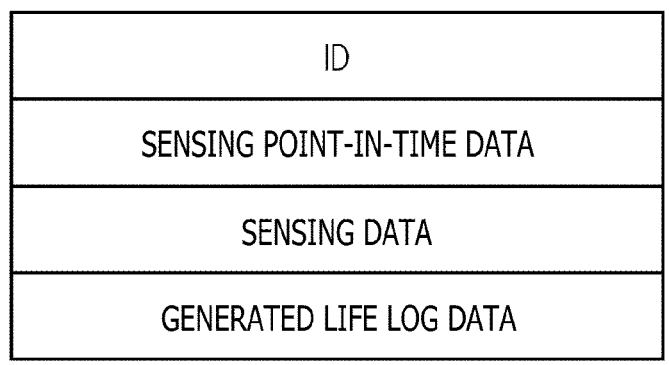
FIG. 5 is a schematic diagram depicting an example of a data structure of individual data.

FIG. 5 is a schematic diagram depicting an example of the data structure of individual data. An ID (Identification) represents identification information identifying the individual data. As described above, the individual data includes the sensing data including captured images and received by the sensing data reception section 40, and the sensing point-in-time data associated with the sensing data.

Also, in this embodiment, for example, the life log data generation section 42 provides generated life log data on the basis of at least either the environmental map or the sensing data. The generated life log data thus provided is added to the individual data including the sensing data of interest.

Here, for example, based on a captured image included in the sensing data and on an environmental map, the life log data generation section 42 generates imaging data indicative of the imaging position or the subject of the captured image, the imaging data being associated with the environmental map. The life log data generation section 42 may add the generated life log data including the imaging data thus generated to the individual data.

The imaging data may be data indicative of the imaging position of a captured image and the imaging direction of that captured image. Here, the imaging position and the imaging direction are represented by a position and a direction in the environmental map.

Further, the imaging data may be data indicative of the imaging position of a captured image and a subject position representing the position of the subject in the captured image. Here, the imaging position and the subject position are represented by positions in the environmental map.

The generated life log data may include posture data indicative of a full-body posture of the user wearing the tracker 12, data indicative of persons extracted from captured images, and texts extracted from the captured images and from sound data.

Also, in this embodiment, processes of reorganization such as deletion of a captured image from the life log data and enhancement of the image quality of a given captured image are carried out.

Figure 6:
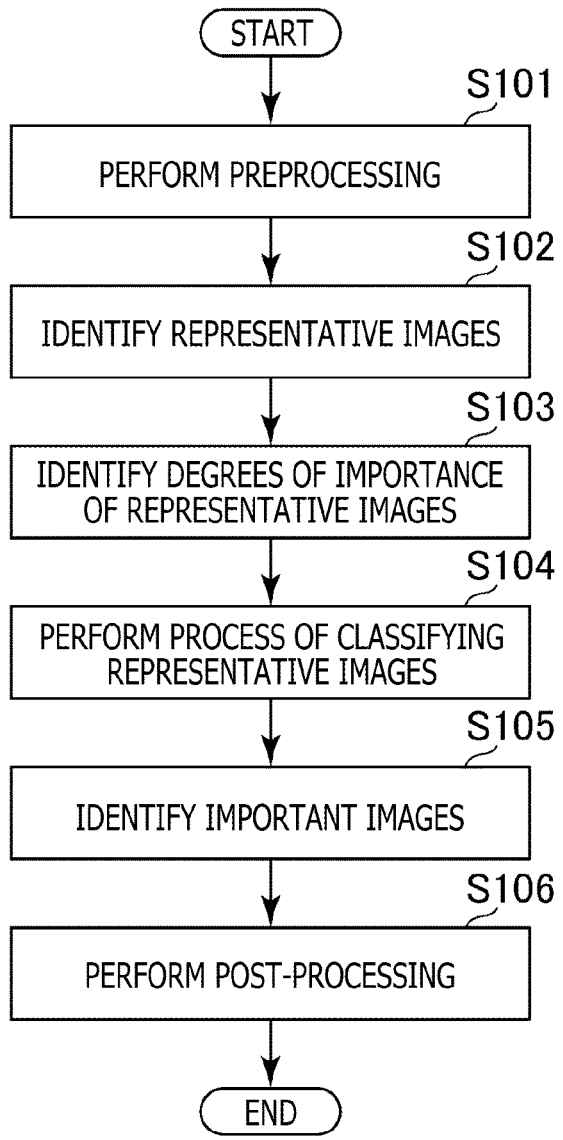
FIG. 6 is a flowchart depicting an example of a flow of processing performed by the server in one embodiment of the present invention.

A typical flow of the reorganization processing performed by the server 10 of this embodiment is explained below with reference to the flowchart depicted in FIG. 6.

First, the life log data generation section 42 performs preprocessing (S101). In the preprocessing of S101, the life log data generation section 42 deletes captured images that meet predetermined conditions representative of bad images from a series of captured images included in the life log data. For example, what is deleted are captured images meeting such conditions as being out of focus, blurred, totally white, or totally black. Also, in the preprocessing of S101, the life log data generation section 42 identifies a captured image that covers only partially a specific subject such as a building. The life log data generation section 42 then combines the captured image thus identified with a captured image of other frames for changing into a captured image covering the whole subject.

The life log data generation section 42 then identifies multiple representative images from among the captured images stored in the life log data storage section 44 (S102). In the process of S102, the life log data generation section 42 identifies, for example, multiple captured images similar to one another, and identifies one of them as a representative image representing these captured images.

Then the life log data generation section 42 identifies a degree of importance of each representative image (S103). Here, the more important a representative image is deemed, the higher the degree of importance identified for that image, for example.

In the process of S103, a representative image depicting a specific person (e.g., predetermined as an important person for the user) may be identified as having a higher degree of importance than the representative images not depicting that person, for example.

Also, in a case where the sound data corresponding to a given representative image includes a sound indicative of an important keyword or the name of the above-mentioned specific person, for example, that representative image may be identified as having a higher degree of importance than the other representative images.

As another example, a representative image depicting the subject of the user's interest may be identified as having a higher degree of importance than the other representative images. Also, a representative image with the subject remaining in it longer than a predetermined period of time under observation by the user may be identified as having a higher degree of importance than the other representative images. Here, the observing position of the user may be identified on the basis of the posture of the tracker 12 determined according to the sensing data, for example. In a case where an eye tracker is included in the sensor section 38, the observing position may be identified on the basis of the result of detection of the line of sight by the eye tracker.

As another example, a representative image of a place registered as a favorite place by this or other users, a representative image of a specific event, a representative image of a place visited more than a predetermined number of times, or a representative image of an event that took place in a specific place may be identified as having a higher degree of importance than the other representative images. Also, a representative image similar to those with their previously identified degrees of importance higher than a predetermined value may be identified as having a higher degree of importance than the other representative images.

Further, by analyzing the sound data corresponding to a representative image or the facial expression of a person found in a representative image, it is possible to identify a degree of how much the situation in that representative image is livened up. Then the representative image depicting a situation greatly livened up may be identified as having a higher degree of importance than the other representative images.

As another example, a representative image depicting a specific subject such as a well-known landmark may be identified as having a higher degree of importance than the other representative images. Here, it may be determined whether or not a given representative image depicts the subject of a specific place, for example, on the basis of the environmental map and the imaging data corresponding to the representative image. For instance, it may be determined whether or not a given representative image depicts the subject of a specific place, on the basis of the environmental map, the imaging position, and the imaging direction. As a further example, it may be determined whether or not a given representative image depicts the subject of a specific place, on the basis of the environmental map and the position of the subject indicated by the imaging data.

Also, it may be determined, for example, whether or not a given representative image depicts a good scene by use of a machine learning model and composition analysis for deep learning. For instance, a representative image with its scene similar to a well-known painting or to a scene in a famous movie may be determined to depict a good scene. Then a representative image determined to depict a good scene may be identified as having a higher degree of importance than the other representative images.

The life log data generation section 42 performs a process of classification to classify the multiple representative images into groups of images associated with a specific event (S104).

Here, the classifying process may be performed by use of the information employed in identifying the degrees of importance in the above-described process of S103. For example, on the basis of the environmental map and the imaging data associated with each of multiple representative images, the life log data generation section 42 may identify a portion of the multiple representative images meeting predetermined conditions as a group of images associated with a given event.

For example, on the basis of an environmental map and of the imaging data associated with multiple representative image, the life log data generation section 42 may identify a portion of the multiple representative images depicting the subject existing in a specific place in the environmental map. Then the life log data generation section 42 may classify the identified portion of the representative images as a group of images associated with events regarding the subject in that specific place.

For example, on the basis of the environmental map and the imaging data associated with a given representative image, it may be determined whether or not the representative image depicts the subject in a specific place. For instance, it may be determined whether or not a given representative image depicts the subject in a specific place, on the basis of the environmental map and of the imaging position and imaging direction indicated by the imaging data associated with the representative image. As another example, it may be determined whether or not a given representative image depicts the subject in a specific place, on the basis of the environmental map and the position of the subject indicated by the imaging data associated with the representative image. Then the representative image determined to depict the subject in a specific place may be classified into a group of images associated with the events regarding the subject.

With this embodiment, as described above, on the basis of an environmental map and the imaging data associated with a given representative image, it is possible to easily identify the position of the subject of the representative image in that environmental map. Thus, the embodiment permits easy identification of captured images by using the subject as the key.

As another example, a clustering process may be performed on the imaging positions indicated by the imaging data associated with the representative images. This leads to executing the classifying process that classifies the representative images into groups of representative images with their imaging positions distanced from each other.

As another example, the classifying process may be performed on the basis of the amount of displacement corresponding to the distance between the imaging positions indicated by the imaging data associated with the representative images. For instance, in a case where there is a distance longer than a predetermined distance between the imaging positions indicated by the imaging data associated with two representative images of which the imaging points in time (i.e., sensing points in time) are consecutive, the group of images between these two representative images may be divided. Likewise, the group of images may be divided between two representative images of which the change in acceleration is greater than what is expected.

As another example, in a case where there is a change greater than a predetermined change between two representative images, the group of images between these two representative images may be divided.

The life log data generation section 42 then identifies at least one important image for each of the events (S105).

In the process of S105, the representative images are each identified as having a degree of importance with respect to each event. Here, for example, the total or an average of the degrees of importance of the representative images corresponding to a given event may be identified as the degree of importance with respect to that event. The higher the degree of importance an event is identified as being given, the larger the number of important images may be identified for that event. Here, given multiple representative images associated with a given event, the number of representative images corresponding to that event in descending order of the importance may be identified as the important images.

As another example, given that the product is computed between the degree of importance of a given event and the degree of importance of each of the representative images, the number of representative images corresponding to that event in descending order of the product may be identified as the important images.

As another example, on the basis of the imaging data associated with a given representative image, the life log data generation section 42 may evaluate a degree of rarity of that representative image. The life log data generation section 42 may then identify a portion of the multiple representative images as the important images, on the basis of the degrees of rarity thus evaluated.

For example, on the basis of the density of positions in which multiple captured images including representative images are acquired, the life log data generation section 42 may identify a portion of the multiple representative images as the important images. For instance, the life log data generation section 42 may identify the number of captured images acquired inside a region of a predetermined size centering on the positions where the representative images are captured. The representative images of which the identified number is small may then be identified preferentially as the important images. For example, the representative images of which the number is smaller than a predetermined number may be identified as the important images.

As described above, the important images may be identified in such a manner that the positions where these images are captured are as dispersed as possible. Likewise, the important images may be identified in such a manner that their compositions or their imaging points in time (i.e., sensing points in time) are as dispersed as possible.

As another example, the important images may be identified on the basis of healthcare data such as pulse rate, heartbeat, and body temperature. For instance, the representative images associated with the healthcare data of a fast pulse rate, a fast heartbeat, or a high body temperature may be identified as the important images.

The life log data generation section 42 then performs post-processing on the important images identified in the process of S105 (S106).

In the process of S106, the life log data generation section 42 may generate a new image higher in quality than a given important image.

For example, on the basis of the imaging data associated with an important image, an imaging position and an imaging direction in the environmental map may be identified. Here, what is identified as the imaging direction may be the direction leading from the imaging position indicated by the imaging data to the subject position indicated by the imaging data. An image may then be generated in a manner depicting how the environmental map is seen from the imaging position in the imaging direction. The life log data generation section 42 may then add the image thus generated to the individual data including the important image of interest.

As another example, an image may be generated in such a manner as to enhance the quality of a given important image by use of the capture images, depth information, and imaging directions regarding a predetermined number of frames before and after that important image. Here, the depth information may be generated on the basis of the depth data included in the sensing data.

Alternatively, the depth information may be generated on the basis of the environmental map and the imaging data. The imaging direction may be identified according to the imaging data. Alternatively, the imaging direction may be identified according to the sensing data. The life log data generation section 42 may then add the image thus generated to the individual data including the important image of interest.

Also, a process of widening the viewing angle may be performed on an important image by connecting the captured subjects spanning multiple frames, for example. Further, an important image may be supplemented with additional frames for HDR (High Dynamic Range) purposes. The life log data generation section 42 may then add the image thus generated to the individual data including the important image of interest.

Also, an important image may be combined with not only preceding and subsequent frames thereof but also images captured at more or less the same time of day on different days, images captured of the same place on different days, or images captured of the same person, for example.

As another example, in a case where important images are continued over multiple frames, a moving image including these important images may be identified as an important moving image. Then, in the process of S106, a stabilizing process such as image stabilization may be performed on the important moving image. The life log data generation section 42 may add the important moving image having undergone the stabilizing process to the individual data associated with an least one of the multiple frames involved.

The processes of S101 through S106 may be carried out at predetermined time intervals, for example.

In the manner described above, an important scene may be captured in high-quality images on the basis of captured images without recourse to separately capturing high-quality images.

The life log according to this embodiment may be employed in such uses as generation of conference minutes, text-based life log searches, reliving of past experiences using virtual reality (VR), restoration of a three-dimensional space since a particular period of childhood, and conversations in synthesized speech.

The life log according to this embodiment may further be employed in such uses as reproduction of changes in a specific place observed through fixed-point observation, identification of the persons with whom the user shared a particular time, and extraction of past travel destinations, of wonderful places visited, or of periodical behaviors in the past.

With this embodiment, the user may always wear the tracker 12 in operation, for example. The embodiment then performs the above-described preprocessing, important image identification, and post-processing (e.g., image quality enhancement) of important images on the moving images captured by the continuously worn tracker 12, without the user becoming aware of the processes involved. The high-quality still images thus generated are presented to the user. In this manner, the user is presented with high-quality photos of the days past without consciously taking such photos.

It is to be noted that the present invention is not limited to the above-described embodiment.

The invention claimed is:

1. An imaging data generation apparatus comprising:
  circuitry configured to
    receive captured images successively;
    generate an environmental map based on a plurality of the captured images;
    generate imaging data indicative of an imaging position or a subject of each of the captured images, the imaging data being associated with the environmental map;
    identify an important image from among the plurality of the captured images on the basis of the environmental map and the imaging data, the important image meeting a predetermined condition relating to a degree of importance; and
    generate an enhanced image by enhancing quality of the important image on the basis of the captured images, depth information generated from the environmental map and from the captured images, and imaging directions, with respect to a plurality of frames of the captured images preceding and subsequent to the important image, wherein
  the imaging data generation apparatus further comprises a healthcare data sensor configured to sense healthcare data including at least one of pulse rate, heartbeat, and body temperature of a user,
  the circuitry is further configured to identify the important image on the basis of the healthcare data sensed by the healthcare data sensor, and
  the enhanced image is a high dynamic range (HDR) image created by enhancing the quality of the important image with the plurality of frames of the captured images.

2. The imaging data generation apparatus according to claim 1, wherein
  the circuitry is further configured to
    identify, on the basis of the imaging data associated with the important image, an imaging position and an imaging direction regarding the important image in the environmental map, and
    generate a new image indicating how things look when the environmental map is viewed from the imaging position identified with respect to the important image in the imaging direction identified with respect to the important image.

3. The imaging data generation apparatus according to claim 1, wherein
  the circuitry is further configured to identify the important image, on the basis of a degree of rarity of each of the captured images associated with the imaging data, the degree of rarity being evaluated on the basis of the imaging data.

4. The imaging data generation apparatus according to claim 3, wherein
  the circuitry is further configured to identify the important image, on the basis of density of positions in which the captured images are acquired.

5. The imaging data generation apparatus according to claim 1, wherein
  the imaging data is either data indicative of an imaging position and an imaging direction of each of the captured images in the environmental map or data indicative of a position of the subject in the environmental map.

6. An imaging data generation method comprising:
  receiving captured images successively;
  generating an environmental map based on a plurality of the captured images;
  generating imaging data indicative of an imaging position or a subject of each of the captured images, the imaging data being associated with the environmental map;
  identifying an important image from among the plurality of the captured images on the basis of the environmental map and the imaging data, the important image meeting a predetermined condition relating to a degree of importance; and
  generating an enhanced image by enhancing quality of the important image on basis of the captured images, depth information generated from the environmental map and from the captured images, and imaging directions, with respect to a plurality of frames of the captured images preceding and subsequent to the important image, wherein
  the enhanced image is a high dynamic range (HDR) image created by enhancing the quality of the important image with the plurality of frames of the captured images, and
  the important image is identified on the basis of healthcare data including at least one of pulse rate, heartbeat, and body temperature of a user.

7. A non-transitory computer-readable storage medium storing instructions that cause a computer to execute instructions for an image data generation, the instructions comprising:

receiving captured images successively;

generating an environmental map based on a plurality of the captured images;

generating imaging data indicative of an imaging position or a subject of each of the captured images, the imaging data being associated with the environmental map;

identifying an important image from among the plurality of the captured images on the basis of the environmental map and the imaging data, the important image meeting a predetermined condition relating to a degree of importance; and generating an enhanced image by enhancing quality of the important image on the basis of the captured images, depth information generated from the environmental map and from the captured images, and imaging directions, with respect to a plurality of frames of the captured images preceding and subsequent to the important image, wherein the enhanced image is a high dynamic range (HDR) image created by enhancing the quality of the important image with the plurality of frames of the captured images, and the important image is identified on the basis of healthcare data including at least one of pulse rate, heartbeat, and body temperature of a user.

8. The imaging data generation apparatus according to claim 1, wherein the circuitry is further configured to identify a plurality of representative images from among the plurality of the captured images, each of the representative images being identified from among those of the plurality of the captured images that are similar to one another.

9. The imaging data generation apparatus according to claim 8, wherein the important image is identified from among the plurality of representative images.

10. The imaging data generation method according to claim 6, wherein the important image is identified on the basis of a degree of rarity of each of the captured images, the degree of rarity being evaluated on the basis of the imaging data associated with the captured images.

11. The imaging data generation method according to claim 10, wherein the important image is identified on the basis of density of positions in which the captured images are acquired.

12. The imaging data generation method according to claim 6, wherein a plurality of representative images is identified from among the plurality of the captured images, each of the representative images being identified from among those of the plurality of the captured images that are similar to one another.

13. The imaging data generation method according to claim 12, wherein the important image is identified from among the plurality of representative images.

14. The non-transitory computer-readable storage medium according to claim 7, wherein the important image is identified on the basis of a degree of rarity of each of the captured images, the degree of rarity being evaluated on the basis of the imaging data associated with the captured images.

15. The non-transitory computer-readable storage medium according to claim 14, wherein the important image is identified on the basis of density of positions in which the captured images are acquired.

16. The non-transitory computer-readable storage medium according to claim 7, wherein a plurality of representative images is identified from among the plurality of the captured images, each of the representative images being identified from among those of the plurality of the captured images that are similar to one another.

17. The non-transitory computer-readable storage medium according to claim 16, wherein the important image is identified from among the plurality of representative images.

* * * * *